US008706351B2

(12) United States Patent
Hasegawa et al.

(10) Patent No.: US 8,706,351 B2
(45) Date of Patent: Apr. 22, 2014

(54) ACTIVE NOISE CANCELLATION APPARATUS

(71) Applicant: Tokai Rubber Industries, Ltd., Aichi (JP)

(72) Inventors: Koichi Hasegawa, Aichi (JP); Akira Katagiri, Aichi (JP); Hideki Oshima, Aichi (JP)

(73) Assignee: Tokai Rubber Industries, Ltd., Aichi (JP)

( * ) Notice: Subject to any disclaimer, the term of this patent is extended or adjusted under 35 U.S.C. 154(b) by 0 days.

(21) Appl. No.: 13/951,965

(22) Filed: Jul. 26, 2013

(65) Prior Publication Data

US 2013/0311040 A1    Nov. 21, 2013

Related U.S. Application Data

(63) Continuation of application No. PCT/JP2012/062200, filed on May 11, 2012.

(30) Foreign Application Priority Data

May 19, 2011  (JP) .................................. 2011-112757
Sep. 10, 2011  (JP) .................................. 2011-197743

(51) Int. Cl.
*G06F 7/00*  (2006.01)

(52) U.S. Cl.
USPC .................. 701/36; 701/37; 701/38; 701/47; 280/124.1; 280/124.108; 280/5.515; 280/137.507; 280/506; 267/90; 267/136

(58) Field of Classification Search
USPC ............. 701/1, 36, 37, 38, 39, 47; 280/124.1, 280/124.108, 5.515, 5.512, 137.507, 506, 280/5.519; 267/2, 90, 136, 140.11; 188/381, 73.35, 73.36, 73.37, 378; 180/902

See application file for complete search history.

(56) References Cited

U.S. PATENT DOCUMENTS

| 7,269,485 | B2 * | 9/2007 | Oikawa et al. ................ 701/1 |
| 8,573,604 | B2 * | 11/2013 | Willems ....................... 280/5.5 |
| 2009/0224502 | A1 * | 9/2009 | Yamawaki et al. .... 280/124.108 |
| 2009/0273147 | A1 * | 11/2009 | Inoue et al. ................ 280/5.51 |

FOREIGN PATENT DOCUMENTS

| JP | 05-053589 | 3/1993 |
| JP | 07-210179 | 8/1995 |
| JP | 07-281676 | 10/1995 |
| JP | 2006-293145 | 10/2006 |
| JP | 2008-120235 | 5/2008 |
| JP | 2010-228641 | 10/2010 |

OTHER PUBLICATIONS

International Search Report in PCT/JP2012/062200 and English language translation thereof, mail date is Aug. 14, 2012.

* cited by examiner

*Primary Examiner* — Rami Khatib
(74) *Attorney, Agent, or Firm* — Greenblum & Bernstein P.L.C.

(57) ABSTRACT

Provided is an active noise cancellation apparatus capable of reliably reducing road noise by a technique other than mounting a vibration generator on a floor panel itself or another plate-like interior part itself, while reducing costs and size of the apparatus. A reference signal detector is mounted on a knuckle and the vibration generator is mounted on a wheel housing or a suspension member. An error signal detector detects vibration of the wheel housing or vibration of the suspension member as an error signal, or detects sound in a vehicle interior as an error signal. A controller controls the vibration generator based on the reference signal and the error signal so as to reduce the error signal.

7 Claims, 9 Drawing Sheets

ACTIVE NOISE CANCELLATION APPARATUS

CROSS-REFERENCE TO RELATED APPLICATION

This is a continuation of Application PCT/JP2012/062200, filed on May 11, 2012, which is incorporated herein by reference. The present invention is based on Japanese Patent Application No. 2011-112757, filed on May 19, 2011, No. 2011-197743, filed on Sep. 10, 2011, the entire contents of which are incorporated herein by reference.

BACKGROUND OF THE INVENTION

1. Field of the Invention

The present invention relates to an active noise cancellation apparatus for actively reducing road noise.

2. Description of the Related Art

It is known that road noise is generated by road surface vibration being transmitted and causing a floor panel or other plate-like interior parts (e.g., a windshield, a rear window, door panels) to vibrate. Some apparatus for actively reducing this road noise are disclosed in Japanese Unexamined Patent Publication Nos. H07-281676 and H07-210179. The apparatus disclosed in Japanese Unexamined Patent Publication No. H07-281676 comprises a vibration generator mounted on a floor panel, uses vibration of a suspension system as a reference signal and vibration of the floor panel as an error signal, and controls the vibration generator so as to reduce the error signal. The patent literature states that road noise can be reduced by suppressing vibration of the floor panel by this vibration generator control.

The apparatus disclosed in Japanese Unexamined Patent Publication No. H07-210179 reduces road noise by detecting acceleration as a reference signal by acceleration sensors mounted on a suspension and a vehicle body, detecting sound pressure in a vehicle interior as an error signal by a microphone, and outputting control sound (secondary sound) by a speaker placed in the vehicle interior.

SUMMARY OF THE INVENTION

By the way, since the floor panel is formed in a thin plate shape, the floor panel has a lower first resonance frequency than other vehicle component parts. Therefore, in some cases, the first resonance frequency of the floor panel is included in a frequency range of vibration of the floor panel caused by vibration input from road surfaces. In these cases, vibration of the floor panel near the first resonance frequency increases, and besides vibration with its high-order frequencies occurs.

Therefore, in order to reduce the vibration of the floor panel by a construction in which a vibration generator and an error signal detection sensor are mounted on the floor panel as in a conventional one, the vibration generator needs to be controlled not only in the first resonance frequency range of the floor panel but also in its high order frequency ranges. Therefore, there is a need to exhibit the function to suppress vibration in a very wide frequency range. Besides, in some cases, road noise is generated by vibration of plate-like interior parts, such as a windshield, a rear window and door panels, other than the floor panel. Also in these cases, there is a need to exhibit the function to suppress vibration in a very wide frequency range.

In this respect, when frequency to be controlled includes a high frequency range (e.g., several kHz or more), it is necessary to upgrade the vibration generator, various sensors, and an electronic circuit for generating a control signal for the vibration generator. Specifically, it is necessary to reduce sampling time of the various sensors and increase arithmetic processing speed of the electronic circuit. In addition, the vibration generator needs to have responsiveness quick enough to be able to respond to the shortened sampling time. These upgrades lead to an increase in costs of the overall apparatus. Even if a high frequency range can be controlled, the control of the high frequency range inevitably has poor responsiveness when compared to that of a low frequency range. Therefore, after all, noise reduction performance degrades in the high frequency range.

Moreover, since vibration of the floor panel or other plate-like interior parts near the first resonance frequency is great, the vibration generator needs to generate vibration having an amplitude capable of suppressing this great vibration. This leads to an increase in the size of the vibration generator.

Furthermore, since vibration of the floor panel shows complex behavior, even if vibration of only a certain portion of the floor panel can be reduced, other portions of the floor panel vibrate and generate road noise. In this respect, mounting a vibration generator on a floor panel cannot sufficiently reduce road noise caused by vibration of other portions of the floor panel on which no vibration generator is mounted. It is possible to mount a large number of vibration generators on the floor panel, but this results in extremely high costs.

On the other hand, when road noise is reduced by outputting control sound (secondary sound) by a speaker placed in a vehicle interior as in Japanese Unexamined Patent Publication No. H07-210179, quiet zones (noise cancellation areas) are different with frequencies. Since a quiet zone is a range of a half wavelength of frequency, the quiet zone is large in a low frequency range and small in a high frequency range. Therefore, noise cancellation effect in the vehicle interior is different with the position of the speaker. That is to say, the noise cancellation effect in the vehicle interior is dependent on the position of the speaker. Furthermore, since frequency to be controlled is in a wide range such as from 30 Hz to 20 kHz, sound control by the speaker needs a control circuit which can perform high-speed arithmetic processing. This leads to a cost increase. Moreover, since the speaker has to be placed in the vehicle interior, it is not easy to install this kind of active noise cancellation apparatus.

The present invention has been made in view of these circumstances. It is an object of the present invention to provide an active noise cancellation apparatus capable of reliably reducing road noise by a technique other than mounting a vibration generator on a floor panel itself or another plate-like interior part itself, while reducing costs and size of the apparatus.

An active noise cancellation apparatus according to the present solution has been designed to reduce road noise by suppressing vibration of a member located during a vibration transmission path from a wheel to a plate-like member such as a floor panel by mounting a vibration generator on the aforementioned member, and as a result reducing vibration of the plate-like member such as a floor panel.

Specifically, the active noise cancellation apparatus according to the present solution is an active noise cancellation apparatus for actively reducing noise in an interior of a vehicle. In this respect, the vehicle generates road noise in the interior of the vehicle by causing a plate-like member of vehicle component parts to vibrate, the plate-like member vibrating by vibration input from road surfaces to a wheel being transmitted to the plate-like member.

The active noise cancellation apparatus comprises: a reference signal detector mounted on a knuckle for supporting the wheel in at least one vibration transmission path from the wheel to the plate-like member and detecting vibration of the knuckle as a reference signal; a vibration generator mounted on a wheel housing or on a suspension member in the vibration transmission path, the wheel housing connected to the plate-like member and supporting a suspension system, the suspension member connected to the plate-like member and constituting the suspension system, and the vibration generator applying vibration force to the wheel housing or the suspension member; an error signal detector for detecting vibration of the wheel housing or vibration of the suspension member as an error signal or detecting sound in the interior of the vehicle as an error signal; and a controller for controlling the vibration generator based on the reference signal and the error signal so as to reduce the error signal.

According to the present solution, the vibration generator is mounted not on the floor panel itself or another plate-like interior part itself but on the wheel housing or the suspension member. That is to say, upon vibrating the wheel housing or the suspension member, vibration of the aforementioned member can be reduced or put in a desired vibrational state.

In this respect, the wheel housing or the suspension member on which the vibration generator is mounted has a higher rigidity than the plate-like member such as the floor panel. Therefore, resonance frequency of the aforementioned member on which the vibration generator is mounted is very higher than that of the plate-like member such as the floor panel. Therefore, a frequency range of vibration of the wheel housing or the suspension member caused by vibration input from road surfaces is sufficiently lower than resonance frequency of the aforementioned member. Therefore, the aforementioned member does not amplify the vibration input from the road surfaces due to its resonance. Moreover, amplitude of the members of the aforementioned suspension system 80 and the like in high-order frequency ranges hardly affects.

That is to say, upon mounting the vibration generator not on the plate-like member itself such as the floor panel but on the wheel housing or the suspension member, vibration of the wheel housing or the suspension member can be sufficiently suppressed or sufficiently put in a desired vibrational state even when frequency to be controlled is in a relatively low frequency range. In this respect, since the frequency to be controlled is in a low frequency range, vibration of the aforementioned member on which the vibration generator is mounted can be suppressed or put in a desired vibrational state with a higher precision in view of arithmetic processing for control and responsiveness of the vibration generator.

Moreover, since the frequency range to be controlled is relatively low, a vibration generator, a variety of sensors and an electronic circuit with not so high performance can play their roles adequately. That is to say, processing can be carried out without decreasing sampling time of the variety of sensors, arithmetic processing speed of the electronic circuit does not have to be high, and the vibration generator can sufficiently suppress the vibration by using low amplitude because of the absence of resonance. Therefore, costs and the size of the vibration generator can be reduced.

Furthermore, when the vibration generator is mounted on the plate-like member such as the floor panel as in a conventional case, there is a need to deal with complex behavior of the floor panel. According to the present solution, however, the vibration generator is mounted not on the plate-like member but on the wheel housing or the suspension member. Therefore, without providing a very great number of vibration generators, vibration of the plate-like member can be reliably reduced or put in a desired vibrational state.

Moreover, a suspension system is included in members located somewhere in the vibration transmission path from the wheel to the plane-like member such as the floor panel. The suspension system includes viscoelastic members. In addition, a reference signal detector is mounted on a knuckle and the vibration generator is mounted on the wheel housing or the suspension member. That is to say, viscoelastic members are present between the member on which the reference signal detector is mounted and the member on which the vibration generator is mounted. Therefore, vibration of the member on which the vibration generator is mounted has a time delay from vibration of the member on which the reference signal detector is mounted. Therefore, the vibration generator can be reliably controlled based on a reference signal and vibration of the member on which the vibration generator is mounted can be reliably put in a desired vibrational state by control.

Furthermore, according to the present solution, road noise is reduced by mounting the vibration generator on the wheel housing or the suspension member and vibrating the aforementioned component part. This technique is free from problems which occur in a case where road noise is reduced by generating control sound (secondary sound) by a speaker. That is to say, since this technique is not noise reduction by generating control sound (secondary sound), such a problem as dependence on the position of the speaker does not arise. Moreover, since vibration is generated by the vibration generator, a range of frequency to be controlled by the vibration generator is very smaller than a range of frequency to be controlled by the speaker. Therefore, arithmetic processing speed of the control circuit can be decreased, and as a result, costs can be reduced. Moreover, since the vibration generator is mounted on a member in the vibration transmission path, the location of the vibration generator has a great degree of freedom when compared to the location of the speaker in the vehicle interior.

In this respect, when the error signal detector detects vibration of the wheel housing or vibration of the suspension member as an error signal, vibration of the wheel housing or the suspension member can be reduced, and vibration to be transmitted to a plate-like member located in a downstream of the aforementioned member in a vibration transmission path is reduced. As a result, road noise caused by vibration of the plate-like member such as the floor panel can be reduced.

On the other hand, when the error signal detector detects sound in the vehicle interior as an error signal, the vibrational state of the wheel housing or another suspension member is controlled by vibrating the vibration generator so as to reduce sound in the interior of the vehicle. As a result, noise in the vehicle interior caused by vibration input from the wheel, namely, road noise can be reliably reduced.

Moreover, the aforementioned vehicle can include the knuckle for rotatably supporting the wheel; a suspension arm connected to the knuckle; a shock absorber connected to the suspension arm; an upper support attached to the shock absorber; and the wheel housing attached to the upper support and connected to the plate-like member. Then, the reference signal detector can be mounted on the knuckle, and the vibration generator and the error signal detector can be mounted on the wheel housing.

In this case, a vibration transmission path is the wheel→the knuckle→the suspension arm→the shock absorber→the upper support→the wheel housing→the plate-like member in this order. In this vibration transmission path, the reference signal detector is mounted on the knuckle on an upstream side, and the vibration generator and the error signal detector are mounted on the wheel housing on a downstream side.

Therefore, vibration of the wheel housing in the aforementioned vibration transmission path can be reliably reduced, and vibration to be transmitted from the wheel housing to the plate-like member can be reliably reduced.

It is especially preferable that the vibration generator and the error signal detector are placed at positions which are closer to the upper support than to the plate-like member on the wheel housing. The aforementioned portion is a portion of the wheel housing having an especially high resonance frequency. Therefore, the aforementioned advantageous effect can be reliably exhibited.

Moreover, the vehicle can include the knuckle for rotatably supporting the wheel; a suspension arm connected to the knuckle; and the suspension member connected to the suspension arm and connected to a floor panel as the plate-like member by way of a member mount. Then, the reference signal detector can be mounted on the knuckle, and the vibration generator and the error signal detector can be mounted on the suspension member.

In this case, a vibration transmission path is the wheel→the knuckle→the suspension arm→the suspension member→the member mount→the floor panel in this order. In this vibration transmission path, the reference signal detector is mounted on the knuckle on an upstream side and the vibration generator and the error signal detector are mounted on the suspension member on a downstream side. Therefore, vibration of the suspension member in the aforementioned vibration transmission path can be reliably reduced, and vibration to be transmitted from the suspension member to the floor panel can be reliably reduced.

Here, as mentioned above, examples of the plate-like member which is a source of road noise include a windshield, a rear window and door panels in addition to the floor panel. Thus, a vehicle has a plurality of sources of road noise. Furthermore, when attention is focused on the floor panel, the floor panel itself can be regarded to have a plurality of sources of road noise because of its complex behavior.

A plurality of vibration transmission paths exist from the wheel to the plate-like member as a source of road noise, as just described. In the presence of a plurality of vibration transmission paths, road noise in the vehicle interior cannot be sufficiently reduced by placing a vibration generator in only one position on a particular portion of the floor panel. If vibration generators and controllers are mounted on all plate-like members which are sources of road noise, costs are very high.

Therefore, when the vibration transmission path from the wheel to the plate-like member is a plurality of vibration transmission paths, the vibration generator can be placed in at least one of the plurality of vibration transmission paths, and the error signal detector can be a microphone for detecting sound in the interior of the vehicle as the error signal.

In spite of the presence of the plurality of vibration transmission paths, this construction enables road noise reduction without mounting vibration generators on all plate-like members which are sources of road noise. The reason is as follows. As mentioned above, sound detected by the microphone placed in the vehicle interior is used as an error signal. Then, the vibration generator generates vibration force so as to reduce the error signal.

Then, while vibration input from road surfaces is transmitted to the plate-like member via the plurality of vibration transmission paths, the vibration generator vibrates a member on which the vibration generator is mounted, thereby causing the plate-like member to vibrate. Thus, a plurality of kinds of vibration transmitted from road surfaces and vibration generated by the vibration generator are combined in the plate-like member. A controller controls the vibration generator so as to reduce the combined vibration of the plate-like member.

That is to say, the vibration generator vibrates the member on which the vibration generator is mounted so as not to reduce vibration of the aforementioned member itself but to reduce road noise in the vehicle interior. The vibration generator does not always reduce vibration of the member itself on which the vibration generator is mounted, and, in some cases, may increase vibration of the aforementioned member itself. Therefore, even in the presence of the plurality of vibration transmission paths, road noise in the vehicle interior can be reliably reduced.

Moreover, the reference signal detector can be mounted on a common component part in the plurality of vibration transmission paths. This enables reliable detection of the reference signal which affects the plurality of vibration transmission paths. Accordingly, a component of the error signal attributable to the reference signal can be reliably reduced.

DESCRIPTION OF THE PREFERRED EMBODIMENTS

Example 1

Outline of Active Noise Cancellation Apparatus

Figure 1:
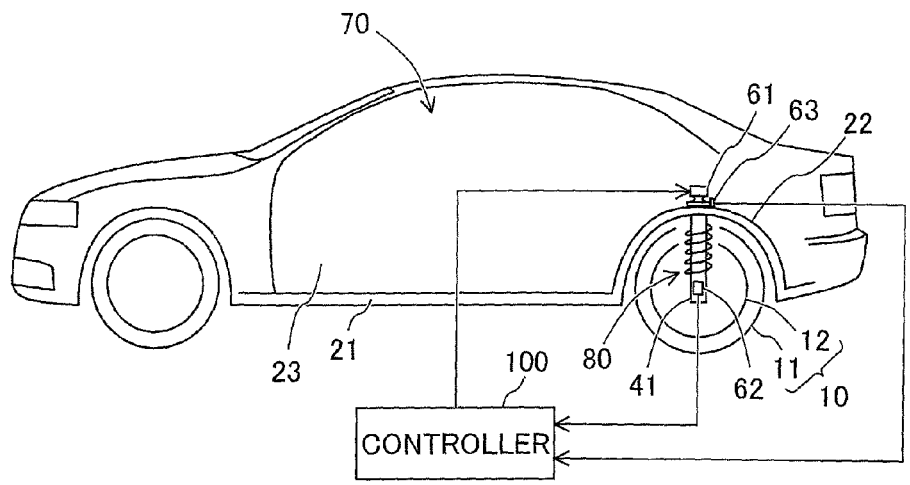
FIG. 1 is a view showing structure of an active noise cancellation apparatus in a vehicle in Example 1.

An active noise cancellation apparatus is an apparatus applied to a vehicle such as an automobile and reducing road noise. The active noise cancellation apparatus reduces road noise not by generating control noise from a speaker in a vehicle interior. As shown in FIG. 1, road noise is generated in a vehicle interior 70 by vibration of a floor panel 21, as a result of road surface vibration caused by moving of a vehicle being transmitted from a wheel 10 to the floor panel 21 via a suspension system 80.

Therefore, if the vibration of the floor panel 21 can be reduced, road noise caused by the vibration of the floor panel 21 can be reduced in this example. However, the active noise cancellation apparatus of this example does not directly reduce the vibration of the floor panel 21 but reduces the vibration of the floor panel 21 as a result of reducing vibration of a portion having an especially high rigidity and located during a vibration transmission path from the wheel 10 to the floor panel 21. Here, road noise is generated by vibration of plate-like interior parts 23, such as a windshield, a rear window, and door panels, in addition to the vibration of the floor panel 21. In this example, a detailed description of road noise generation by the floor panel 21 will be given below.

The active noise cancellation apparatus detects vehicle vertical vibration as a reference signal by a reference signal detector 62 comprising an acceleration sensor attached to a knuckle 41, detects vehicle vertical vibration as an error signal by an error signal detector 63 comprising an acceleration sensor attached to a wheel housing 22, and adaptively controls a vibration generator 61 attached to the wheel housing 22 so as to reduce the error signal. Detailed construction of the active noise cancellation apparatus will be described below.

Detailed Construction of Active Noise Cancellation Apparatus

Connection Mechanism from Wheel to Floor Panel

Figure 2:
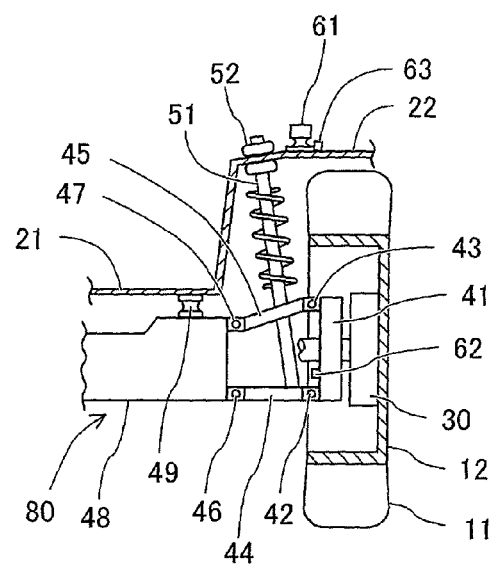
FIG. 2 is a view from the rear of the vehicle showing the structure of FIG. 1 in a vibration transmission path from a wheel to a floor panel.

A connection mechanism from the wheel 10 to the floor panel 21 will be described with reference to FIGS. 1 and 2. As shown in FIGS. 1 and 2, the wheel 10 and the floor panel 21 are connected by the suspension system 80. Specifically, an axle 30 is connected to a metal wheel 12 of the wheel 10 which holds a tire 11. Upon rotational driving force from a driving source being transmitted to this axle 30 by way of a differential, not shown, the axle 30 rotates the wheel 10.

The knuckle 41 rotatably supports this axle 30. That is to say, when the metal wheel 12 moves in a radial direction, the knuckle 41 moves in association with the radial move of the metal wheel 12. That is to say, the knuckle 41 is vibrated by vibration transmitted to the metal wheel 12 via the tire 11.

The knuckle 41 is connected to a lower arm 44 and an upper arm 45 as suspension arms via bushes 42, 43 comprising viscoelastic bodies. The lower arm 44 and the upper arm 45 are connected to a suspension member 48 via bushes 46, 47 comprising viscoelastic bodies. A member mount 49 comprising a viscoelastic body is attached between the suspension member 48 and a lower surface of the floor panel 21.

Moreover, a lower end of a shock absorber 51 is fixed on the lower arm 44. An upper support 52 comprising a viscoelastic body is attached to an upper end of the shock absorber 51. The upper support 52 is connected to the wheel housing 22 (a member for housing the tire 11) of a vehicle body. The wheel housing 22 is connected to the floor panel 21.

The abovementioned structure makes it difficult for vibration input from road surfaces by moving of the vehicle to be transmitted from the wheel 10 to the vehicle body, while securely supporting the vehicle body (including the floor panel 21 and the wheel housing 22). Here, the suspension system 80 is a device which includes the knuckle 41, the lower arm 44, the upper arm 45, the suspension member 48, the member mount 49, the shock absorber 51, the upper support 52, and the respective bushes 42, 43, 46, 47. The floor panel 21 is formed in a thin plate shape and the respective members constituting the suspension system 80 have a high rigidity when compared to the floor panel 21.

Particularly a portion of the wheel housing 22 near a position where the upper support 52 is attached is formed to have a high rigidity when compared to the floor panel 21. That is to say, resonance frequency of the suspension system 80 as a whole, resonance frequencies of the respective members constituting the suspension system 80, and resonance frequency of the portion of the wheel housing 22 near the position where the upper support 52 is attached are higher than resonance frequency of the floor panel 21.

Furthermore, the vibration generator 61 is mounted on the wheel housing 22. The vibration generator 61 is located at a position on the wheel housing 22 which is closer to the upper support 52 than to the floor panel 21, specifically speaking, on the portion of the wheel housing 22 near the position where the upper support 52 is mounted (the portion having a high rigidity). The vibration generator 61 is equipped with an electromagnetic actuator such as a solenoid and a voice coil and actively generates vibration force upon being supplied with an electric current. That is to say, vibration force generated by the vibration generator 61 vibrates the wheel housing 22 on which the vibration generator 61 is mounted. This vibration force is mainly in a vertical direction of the vehicle. A control signal for driving the vibration generator 61 is generated by a controller 100 mentioned later. It should be noted that since structure of the electromagnetic actuator used in the vibration generator 61 is known, detailed description is omitted.

Furthermore, an acceleration sensor as the reference signal detector 62 is mounted on the knuckle 41. This reference signal detector 62 detects vibration of the knuckle 41 in the vertical direction of the vehicle. On the other hand, an acceleration sensor as the error signal detector 63 is mounted on the wheel housing 22. Especially the error signal detector 63 is mounted on a portion of the wheel housing 22 which supports the suspension system 80, specifically, on a portion of the wheel housing 22 on which the vibration generator 61 is attached. This error signal detector 63 detects vibration of the portion of the wheel housing 22 on which the vibration generator 61 is mounted, in the vertical direction of the vehicle. That is to say, this error signal detector 63 detects vibration obtained by combining vibration transmitted from the wheel 10 and the vibration force generated by the vibration generator 61.

(Relation Between Vibration Transmission Path and Member Suppressed from Vibrating)

Next, a path in which vibration input from road surfaces is transmitted to cause road noise in the vehicle interior 70 (a vibration transmission path) in this example will be described with reference to FIG. 3. Here, a source of road noise in the vehicle interior 70 is the floor panel 21 (or another plate-like interior member 23). That is to say, road noise is generated in the vehicle interior 70 by planar vibration of the floor panel 21 (or another plate-like interior member 23).

Figure 3:
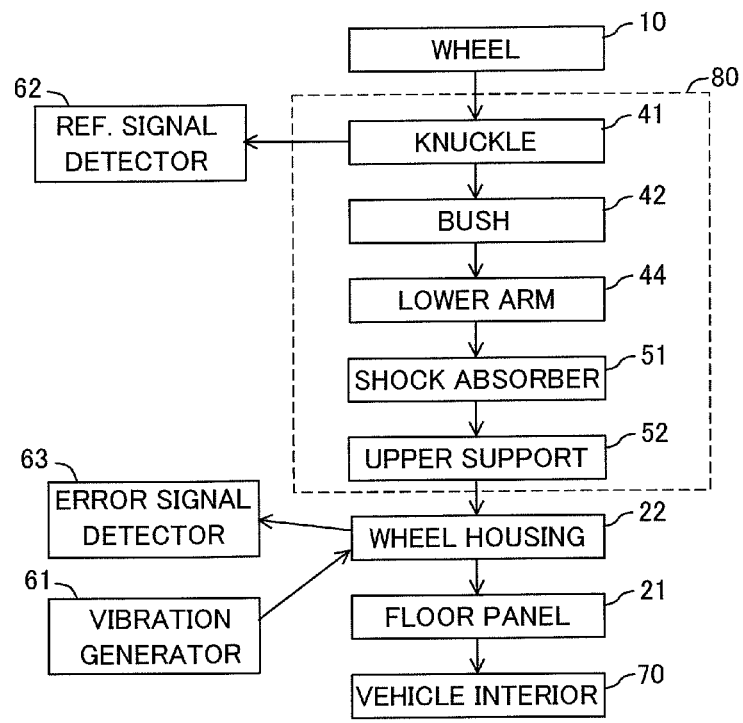
FIG. 3 shows a road noise transmission path from the wheel to a vehicle interior in Example 1.

As shown in FIG. 3, the vibration transmission path from the wheel 10 to the floor panel 21 is the wheel 10→the knuckle 41→the bush 42→the lower arm 44→the shock absorber 51→the upper support 52→the wheel housing 22→the floor panel 21 in this order.

The reference signal detector 62 is mounted on the knuckle 41. That is to say, the reference signal detector 62 is placed on a side of the wheel 10 in the vibration transmission path from the wheel 10 to the floor panel 21. Therefore, the reference signal detector 62 can detect vibration input from road surfaces in an early stage.

On the other hand, the error signal detector 63 is mounted on the portion of the wheel housing 22 on which the vibration generator 61 is mounted. That is to say, the error signal detector 63 is placed on a side of the floor panel 21 in the vibration transmission path from the wheel 10 to the floor panel 21. Here, the viscoelastic members are present between the knuckle 41 and the wheel housing 22 as mentioned above. Therefore, the error signal detector 63 detects vibration of the member which vibrates with a time delay from the vibration of the knuckle 41.

Control Block Diagram

Next, a control block diagram of the vibration generator 61 will be described with reference to FIG. 4. The controller 100 controls the vibration generator 61 so as to reduce (cancel) the error signal by using adaptive control and employing a reference signal detected by the reference signal detector 62 and an error signal detected by the error signal detector 63.

Filtered X LMS algorithm is used as an example of adaptive control algorithm in Example 1. However, it is possible to use LMS algorithm, FDA algorithm, direct LMS algorithm, direct RLS algorithm, or direct FDA algorithm instead of the filtered-X LMS algorithm.

Figure 4:
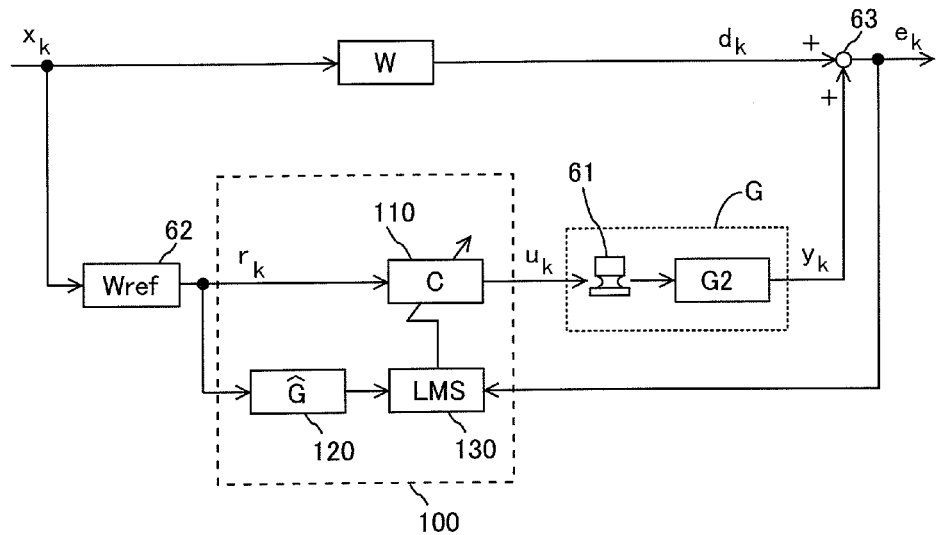
FIG. 4 is a control block diagram for controlling a vibration generator by a controller in Example 1.

As shown in FIG. 4, the controller 100 comprises a control signal generating unit 110, a transfer function estimating unit 120 and a filter updating unit 130. The control signal generating unit 110 generates a control signal $u_k$ by using a reference signal generated by the reference signal detector 62 and an adaptive filter $C_k$, which is updated by the filter updating unit 130 mentioned later. This control signal $u_k$ is expressed as Equation (1). It should be noted that the suffix k designates the number of samples (time steps). The control single $u_k$ is output to the vibration generator 61 and serves as a control signal of the vibration generator 61. That is to say, the vibration generator 61 generates vibration force in accordance with the control signal $u_k$ (hereinafter also referred to as "control vibration").

[Math. 1]

$$u_k = C_k * r_k \quad (1)$$

wherein $u_k$ is a control signal, $C_k$ is an adaptive filter, $r_k$ is a reference signal, and * is a convolution operator.

The control vibration generated by the vibration generator 61 is transmitted to the error signal detector 63 through a transfer function G2. That is to say, the transfer function G2 is a transfer function from the vibration generator 61 to the error signal detector 63. Transmitted control vibration at that time is $y_k$. Here, G is a transfer function from the control signal generating unit 110 to the error signal detector 63. The above relation is expressed as Equation (2).

[Math 2]

$$y_k = G * u_k \quad (2)$$
$$= G * C_k * r_k$$

wherein $y_k$ is transmitted control vibration in the error signal detector, G is a transfer function from the control signal generating unit to the error signal detector, and * is a convolution operator.

Here, vibration $x_k$ input to the wheel 10 is transmitted to the position of the error signal detector 63 through a transfer function W of a first path. Transmitted vibration at that time is $d_k$. The transfer function W of the first path is a transfer function of a path from the wheel 10 to the error signal detector 63 through the suspension system 80. This relation is expressed by Equation (3).

[Math. 3]

$$d_k = W * x_k \quad (3)$$

wherein $d_k$ is transmitted vibration in the error signal detector, W is a transfer function from the wheel to the error signal detector, and * is a convolution operator.

The error signal detected by the error signal detector 63 is $e_k$, as shown in Equation (4). That is to say, the error signal $e_k$ is a signal obtained by combining vibration $d_k$ which has been transmitted through the transfer function W from vibration $X_k$ input in the wheel 10, and the transmitted control vibration $y_k$ which have been output by and transmitted from the vibration generator 61. The control signal generating unit 110 updates the adaptive filter C in the control signal generating unit 110 so as to reduce (cancel) this error signal $e_k$.

[Math 4]

$$\begin{aligned} e_k &= d_k + y_k \\ &= W * x_k + G * C_k * r_k \end{aligned} \quad (4)$$

wherein $e_k$ is an error signal in the error signal detector.

The transfer function estimating unit 120 identifies the transfer function G beforehand and stores the identified transfer function estimate value Gh. For example, the transfer function estimating unit 120 stores the transfer function estimate value Gh as a value which depends on frequency, amplitude, phase and so on of a reference signal $r_k$ detected by the reference signal detector 62, for instance. Here, a mark "^" on symbols in FIG. 4 and the following equations is called a hat and means an estimate value. However, the mark "^" is described as "h" in the text for convenience of description.

The filter updating unit 130 updates the adaptive filter $C_k$ based on the error signal $e_k$ detected by the error signal detector 63 and the transfer function estimate value Gh obtained by the transfer function estimating unit 120.

This update processing will be described in detail. First, the filter updating unit 130 sets an evaluation function $J_k$ as shown in Equation (5). The filter updating unit 130 calculates the adaptive filter $C_k$ which minimizes this evaluation function $J_k$.

[Math. 5]

$$J_k = e_k^2 \quad (5)$$

wherein $J_k$ is an evaluation function, and $e_k$ is an error signal.

Then a gradient vector $\nabla_k$ is set as shown in a first line of Equation (6). The gradient vector $\nabla_k$ is obtained by partially differentiating the evaluation function $J_k$ with respect to the adaptive filter $C_k$. Then, the gradient vector $\nabla_k$ is expressed as shown on the right side in a second line of Equation (6). Moreover, from Equation (4), the gradient vector $\nabla_k$ is expressed as shown on the right side of a third line of Equation (6).

[Math 6]

$$\nabla_k = \frac{\partial J_k}{\partial C_k} \quad (6)$$
$$= 2 \cdot e_k \cdot \frac{\partial e_k}{\partial C_k}$$
$$= 2 \cdot e_k \cdot G * r_k$$

The adaptive filter $C_{k+1}$ after update is computed by calculating a term by multiplying the calculated gradient vector $\nabla_k$ with a step size parameter $\mu$ and then subtracting that term from the last updated adaptive filter $C_k$, as shown in a first line of Equation (7). However, the transfer function G in Equation (6) is replaced with a transfer function estimate value Gh obtained by the transfer function estimating unit 120. Furthermore, upon substituting Equation (6), a formula for updating the adaptive filter C is expressed as shown in a second line of Equation (7).

[Math 7]

$$C_{k+1} = C_k - \mu \cdot (\nabla_k) \quad (7)$$
$$= C_k - 2 \cdot \mu \cdot e_k \cdot \hat{G} * r_k$$

EXPERIMENT

An experiment was carried out on the aforementioned active noise cancellation apparatus. In this experiment, random vibration in the vertical direction of the vehicle was added to the metal wheel 12 and at that time an error signal was detected by the error signal detector 63 while noise in the vehicle interior was detected by the microphone placed in the vehicle interior. For comparison, a similar experience was carried out without control of the controller 100, that is to say, without actuating the vibration generator 61.

Experimental Results

Figure 5:
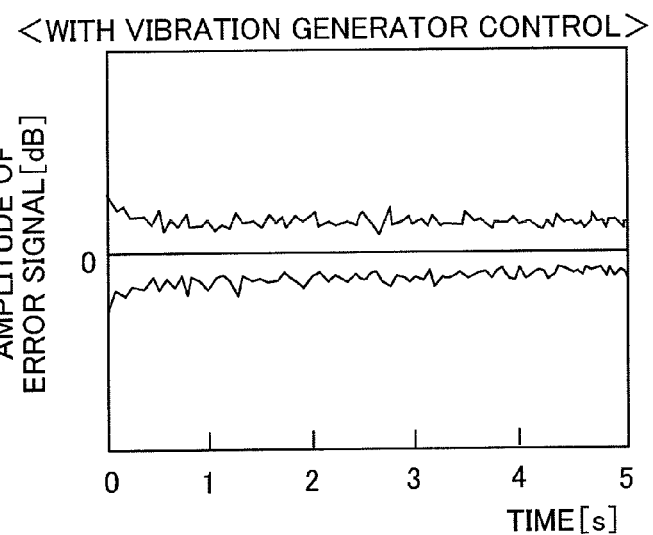
FIG. 5 is a graph showing variation with time in amplitude of an acceleration sensor with control of the vibration generator in Example 1.
Figure 6:
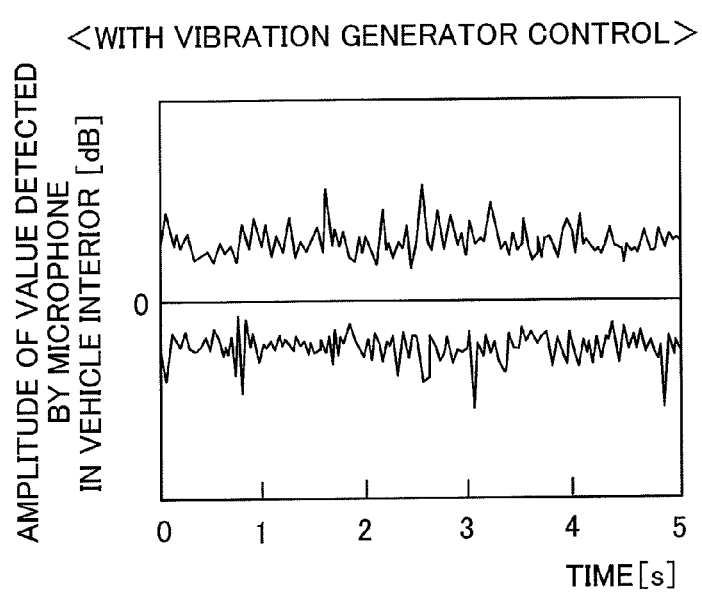
FIG. 6 is a graph showing variation with time in amplitude of a microphone placed in a vehicle interior with control of the vibration generator in Example 1.
Figure 7:
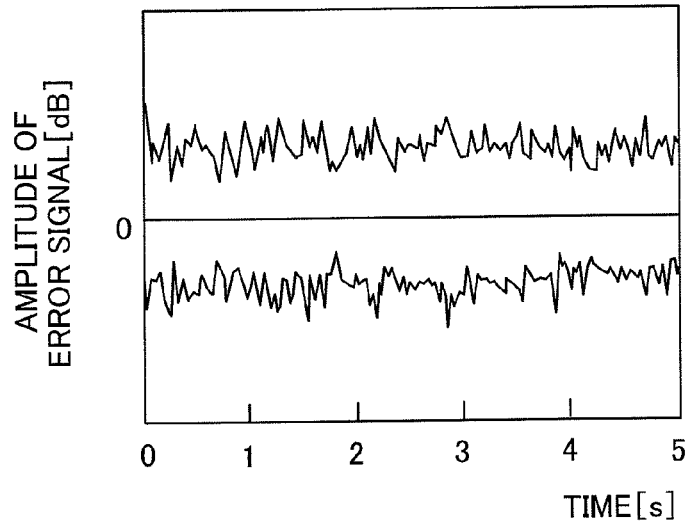
FIG. 7 is a graph showing variation with time in amplitude of the acceleration sensor without control of the vibration generator in Example 1.
Figure 8:
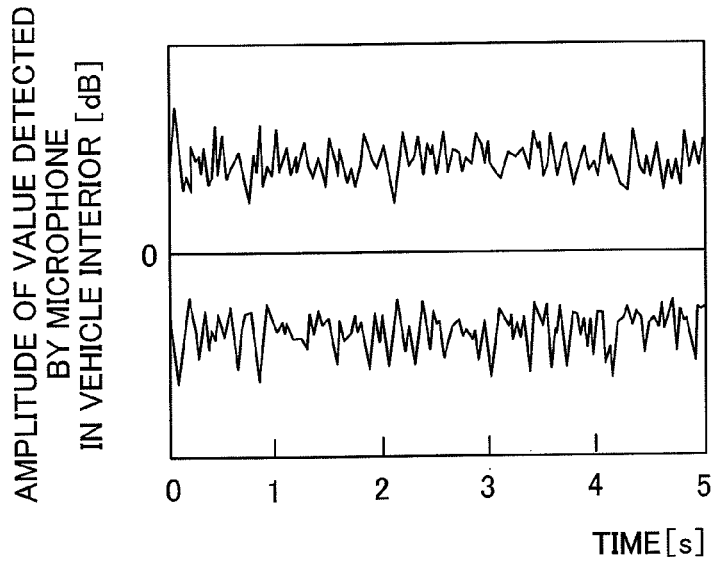
FIG. 8 is a graph showing vibration with time in amplitude of the microphone placed in the vehicle interior without control of the vibration generator in Example 1.

For experimental results with the control of the controller 100, variation with time in amplitude of the error signal of the error signal detector 63 is shown in FIG. 5. In addition, variation with time in amplitude of a value detected by the microphone in the vehicle interior is shown in FIG. 6. For experimental results with control of the controller 100, variation with time in amplitude of the error signal of the error signal detector 63 is shown in FIG. 7. In addition, variation with time in amplitude of a value detected by the microphone in the vehicle interior is shown in FIG. 8. It should be noted that in FIGS. 5 to 8, only peaks of the error signal or the value detected by the microphone are shown as continuous lines.

A comparison of FIG. 5 and FIG. 7 shows that amplitude of the error signal itself was decreased by control of the controller 100. A comparison of FIG. 6 and FIG. 8 shows that amplitude of the value detected by the microphone in the vehicle interior was decreased by control of the controller 100.

Figure 9:
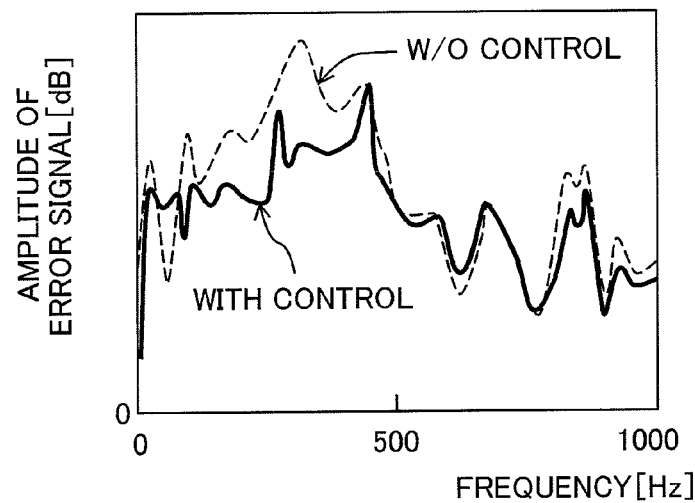
FIG. 9 is a graph showing amplitude of the acceleration sensor versus frequency in Example 1.
Figure 10:
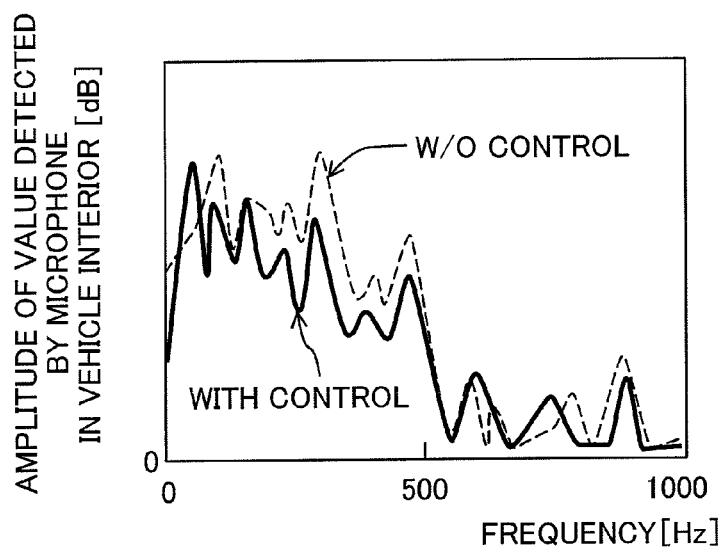
FIG. 10 is a graph showing amplitude of the microphone versus frequency in Example 1.

The results shown in FIGS. 5 to 8 were analyzed using fast Fourier transformation (FFT) and obtained relations between amplitude and frequency are shown in FIGS. 9 and 10. In FIGS. 9 and 10, heavy solid lines indicate a case with control of the controller 100, and broken lines indicate a case without control of the controller 100.

It is apparent from FIGS. 9 and 10 that peak values especially near hundreds of hertz were decreased. This frequency range is near a first resonance frequency of the floor panel 21 and it is understood that vibration caused by resonance of the floor panel 21 was able to be suppressed.

As having been described above, the vibration generator 61 and the error signal detector 63 are mounted not on the floor panel 21 but on the member located at the position which is closer to the wheel 10 than to the floor panel 21 in the vibration transmission path, specifically, on the wheel housing 22. That is to say, vibration of the wheel housing 22 is reduced by vibrating the wheel housing 22. If the vibration of the wheel housing 22 can be reduced, vibration to be transmitted to the floor panel 21 located on a downstream side in the vibration transmission path is reduced.

In this respect, the vibration transmission path includes the suspension system 80 between the floor panel 21 and the wheel 10. The suspension system 80 has a very high rigidity when compared to the floor panel 21. Therefore, resonance frequency of the suspension system 80 is very higher than resonance frequency of the floor panel 21. Moreover, the portion of the wheel housing 22 which supports the suspension system 80 also has a high rigidity when compared to the floor panel 21. Therefore, resonance frequency of the aforementioned portion of the wheel housing 22 is higher than resonance frequency of the floor panel 21.

Therefore, in the suspension system 80 and the aforementioned portion of the wheel housing, a frequency range of vibration caused by vibration input from road surfaces is sufficiently lower than resonance frequency of members of the aforementioned suspension system 80 and the like. Hence, the members of the aforementioned suspension system 80 and the like do not amplify the vibration input from road surfaces by their resonance. Furthermore, amplitude of the members of the aforementioned suspension system 80 and the like in high-order frequency ranges hardly affects.

That is to say, upon mounting the vibration generator 61 and the error signal detector 63 not on the floor panel 21 but on the suspension system 80 or the portion which supports the suspension system 80, vibration of the suspension system 80 and the like can be sufficiently suppressed even when frequency to be controlled is in a relatively low frequency range. This can reduce vibration of the floor panel 21 located on a downstream side in the vibration transmission path. As a result, road noise caused by the vibration of the floor panel 21 can be reduced. Moreover, since the frequency to be controlled is in a low frequency range, the vibration can be suppressed with a higher precision in view of arithmetic processing for control and responsiveness of the vibration generator 61. This can also reduce road noise with a higher precision.

Since the frequency range to be controlled is relatively low as mentioned above, the vibration generator 61, the reference signal detector 62, the error signal detector 63, and the electronic circuit of the controller 100 with not so high performance can play their roles adequately. That is to say, processing can be performed without decreasing sampling time of the reference signal detector 62 or the error signal detector 63, arithmetic processing speed of the electronic circuit of the controller 100 does not have to be high, and because the vibration generator 61 does not resonance, the vibration generator 61 can sufficiently suppress vibration by applying vibration with a low amplitude. Therefore, costs can be reduced and the size of the vibration generator 61 can be reduced.

Moreover, the suspension system 80 connecting the wheel 10 and the floor panel 21 includes viscoelastic members. That is to say, the viscoelastic members are present between the member on which the reference signal detector 62 is mounted (the knuckle 41), and the member on which the vibration generator 61 and the error signal detector 63 are mounted (the wheel housing 22). Accordingly, vibration of the member on which the vibration generator 61 is mounted (the wheel housing 22) has a time delay from vibration of the member on which the reference signal is mounted (the knuckle 41). Therefore, upon controlling the vibration generator 61 based on the reference signal, vibration of the member on which the vibration generator 61 is mounted can be reliably reduced.

Example 2

Example 2 will be described with reference to FIG. 11. The same constitutional elements as those of Example 1 are designated by the same reference numerals and their detailed description will be omitted here. Example 2 is different from Example 1 in locations of a vibration generator 161 and an error signal detector 163, which is an acceleration sensor.

Figure 11:
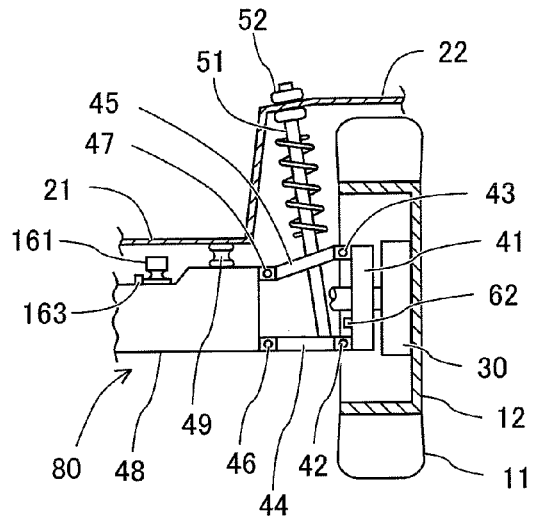
FIG. 11 is a view showing structure in a vibration transmission path from a wheel to a floor panel in Example 2.

As shown in FIG. 11, the vibration generator 161 is attached to a suspension member 48. That is to say, the vibration generator 161 reduces vibration of the suspension member 48 by applying vibration force to the suspension member 48. On the other hand, the error acceleration sensor serving as the error signal detector 163 is mounted on a portion of the suspension member 48 on which the vibration generator 161 is mounted.

Figure 12:
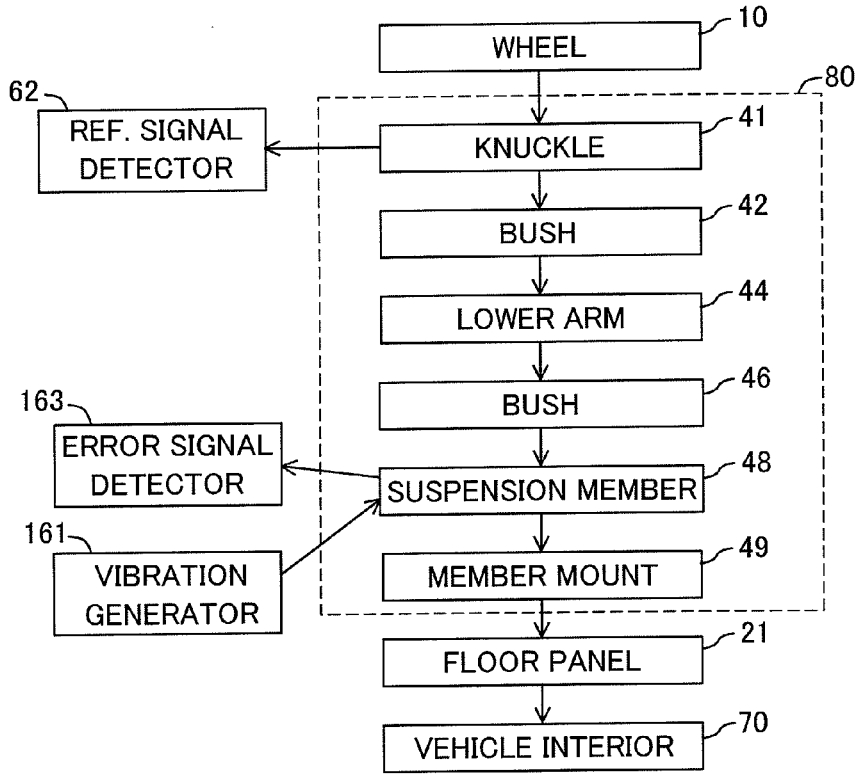
FIG. 12 is a diagram showing a road noise transmission path from the wheel to a vehicle interior in Example 2.

In this case, locations of a reference signal detector 62, the vibration generator 161, and the error signal detector 163 will be described with reference to FIG. 12 together with a vibration transmission path. As shown in FIG. 12, a vibration transmission path from a wheel 10 to a floor panel 21 is the wheel 10→a knuckle 41→a bush 42→a lower arm 44→a bush 46→the suspension member 48→a member mount 49→the floor panel 21 in this order.

The reference signal detector 62 is mounted on the knuckle 41 just like in Example 1. The error signal detector 163 is mounted on a portion of the suspension member 48 on which the vibration generator 161 is attached. That is to say, the error signal detector 163 is mounted on a side of the floor panel 21 in the vibration transmission path from the wheel 10 to the floor panel 21. Here, the viscoelastic members are present between the knuckle 41 and the suspension member 48 as mentioned before. Therefore, the error signal detector 163 detects vibration of the member which vibrates with a time delay from vibration of the knuckle 41. In this example, vibration to be transmitted to the floor panel 21 by way of the suspension member 48 can be reduced. Therefore, the aforementioned vibration of the floor panel 21 can be more reliably reduced. In addition, the advantageous effects mentioned in Example 1 can be exhibited.

Upon further comprising the vibration generator 61 and the error signal detector 63 mentioned in Example 1, the active noise cancellation apparatus of this example can have the advantageous effects of both Examples 1 and 2. This construction enables vibration reduction during each of the two vibration transmission paths from the wheel 10 to the floor panel 21. Therefore, the vibration of the floor panel 21 can be more reliably reduced. As a result, road noise in the vehicle interior can be further reduced.

Example 3

Example 3 will be described with reference to FIGS. 13 to 15. The same constitutional elements as those of Example 1 are designated by the same reference numerals and their detailed description will be omitted here. Example 3 is different from Example 1 in that an error signal detector 263 is a microphone placed in a vehicle interior 70. It is assumed that there are a plurality of vibration transmission paths from a wheel 10 to a floor panel 21 and a plate-like interior member 23, which are sources of road noise.

Figure 13:
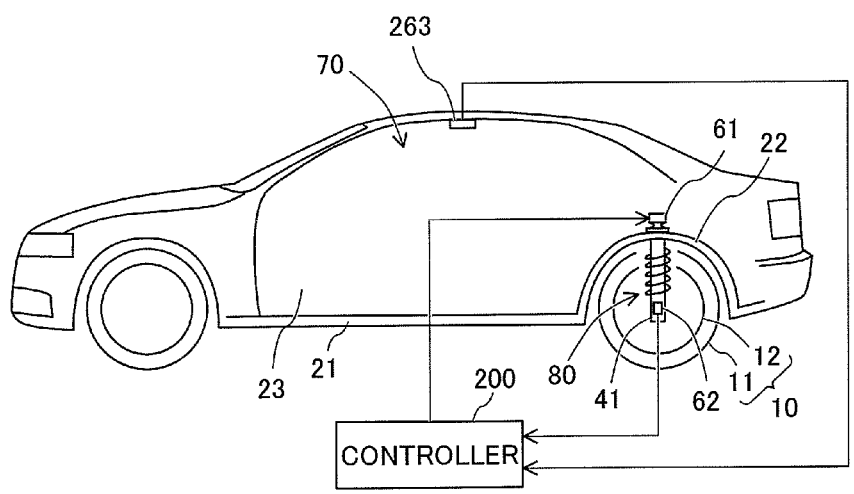
FIG. 13 is a view showing structure of an active noise cancellation apparatus in a vehicle in Example 3.

As shown in FIG. 13, an acceleration sensor serving as a reference signal detector 62 is mounted on a knuckle 41. Moreover, the microphone serving as the error signal detector 263 is mounted on a ceiling of the vehicle interior 70. This error signal detector 63 detects sound in the vehicle interior 70 as an error signal. That is to say, the active noise cancellation apparatus of this example detects vertical vibration of the vehicle as a reference signal by the reference signal detector 62 attached to the knuckle 41, detects sound in the vehicle interior 70 as an error signal by the error signal detector 263 placed, for example, on the ceiling in the vehicle interior and adaptively controls a vibration generator 61 attached to a wheel housing 22 so as to reduce the sound in the vehicle interior 70.

Vibration Transmission Paths

Now the paths in which vibration input from road surfaces is transmitted to cause road noise in the vehicle interior 70 in this example will be described with reference to FIG. 14. Here, sources of road noise in the vehicle interior 70 are plate-like members of the vehicle component parts, such as the floor panel 21 and a door panel 23. That is to say, road noise is generated in the vehicle interior 70 by planar vibration of the floor panel 21, the door panel 23 and so on.

Figure 14:
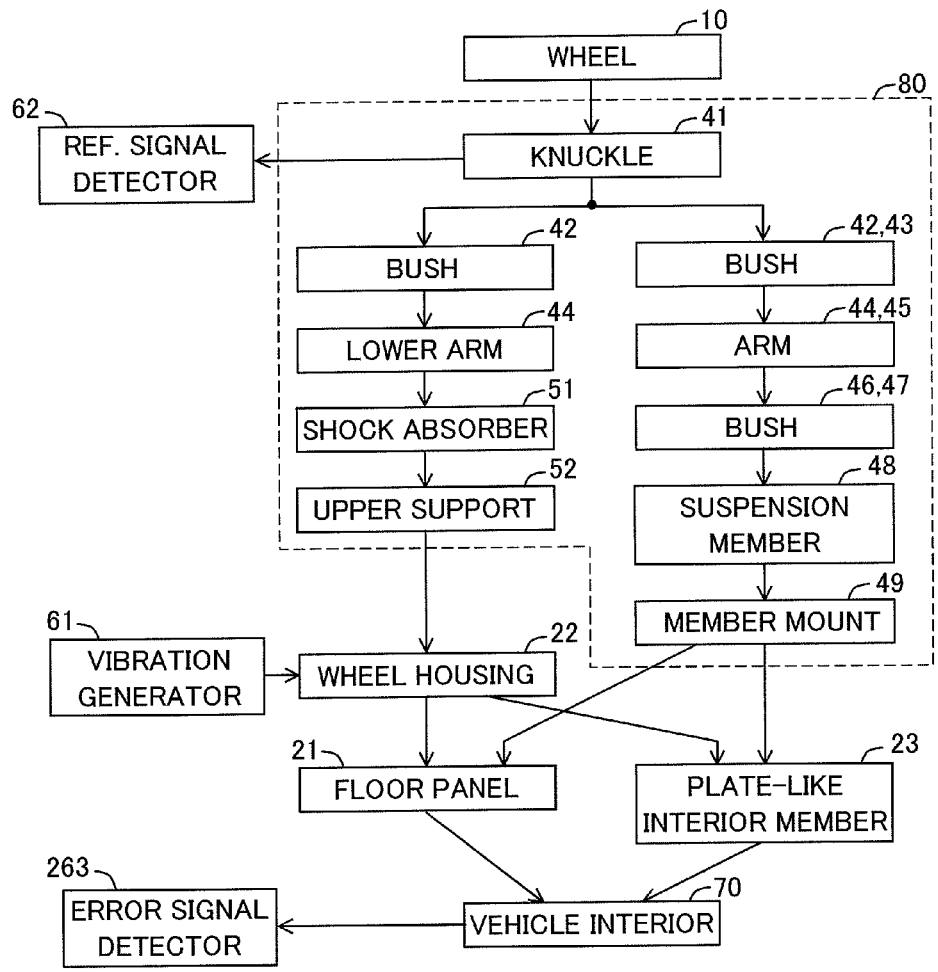
FIG. 14 is a diagram showing road noise transmission paths from a wheel to a vehicle interior in Example 3.
Figure 15:
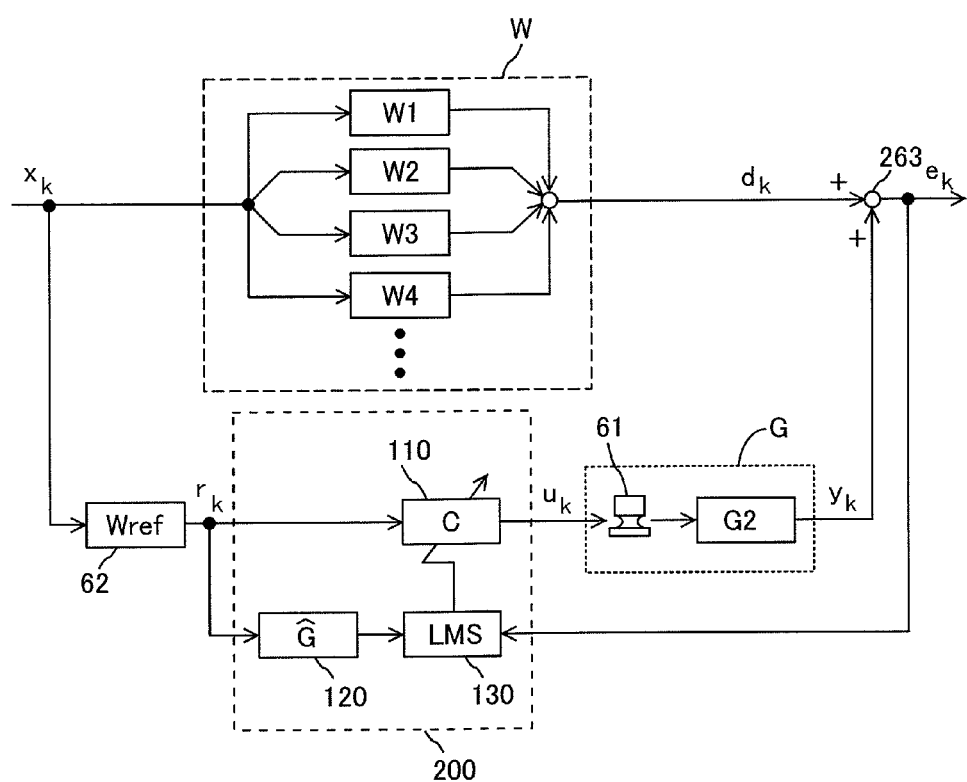
FIG. 15 is a control block diagram for controlling a vibration generator by a controller in Example 3.

As shown in FIG. 14, a plurality of vibration transmission paths are present from the wheel 10 to the floor panel 21 or the door panel 23 as a source of road noise. Special attention should be paid to the presence of a plurality of vibration transmission paths from the wheel 10 to the floor panel 21 and a plurality of vibration transmission paths from the wheel 10 to the door panel 23. In reality, the floor panel 21 itself has a plurality of portions which generate vibration, and a plurality of vibration transmission paths exist in the floor panel 21. Hereinafter, part of a number of vibration transmission paths will be described.

A first vibration transmission path is the wheel 10→the knuckle 41→a bush 42→a lower arm 44→a shock absorber 51→an upper support 52→a wheel housing 22→the floor panel 21 in this order. A second vibration transmission path is the wheel 10→the knuckle 41→bushes 42, 43→a lower arm 44, an upper arm 45→bushes 46, 47→a suspension member 48→a member mount 49→the floor panel 21 in this order.

A third vibration transmission path is the wheel 10→the knuckle 41→the bush 42→the lower arm 44→the shock absorber 51→the upper support 52→the wheel housing 22→the door panel 23. A fourth vibration transmission path is the wheel 10→the knuckle 41→the bushes 42, 43→the lower arm 44, the upper arm 45→the bushes 46, 47→the suspension member 48→the member mount 49→the door panel 23.

The knuckle 41 on which the reference signal detector 62 is mounted is a common component part of the first to fourth vibration transmission paths. Therefore, vibration detected by the reference signal detector 62 is associated with all the vibration in the first to the fourth vibration transmission paths. Moreover, the knuckle 41 on which the reference signal detector 62 is mounted is a member located in an uppermost stream of the vibration transmission paths. That is to say, vibration detected by the reference signal detector 62 is vibration which is the closest to the vibration of the wheel 62, and time from a start of vibration of the wheel 10 to detection by the reference signal detector 62 is very short. Therefore, the reference signal detector 62 can detect the vibration input from road surfaces in an early stage.

In addition, the wheel housing 22 on which the vibration generator 61 is mounted is a member constituting the first and the second vibration transmission paths and located in a downstream of the knuckle 41 on which the reference signal detector 62 is mounted, in the vibration transmission paths. The vehicle interior 70 in which the error signal detector 263 is placed is not during the vibration transmission paths but in a region where noise is generated by vibration of the floor panel 21 or the door panel at ends of the vibration transmission paths.

Control Block Diagram

Next, a control block diagram for controlling the vibration generator 61 in this example will be described with reference to FIG. 15. A controller 200 controls the vibration generator 61 so as to reduce (cancel) the error signal by using adaptive control and employing the reference signal detected by the reference signal detector 62 and the error signal detected by the error signal detector 263. The transfer functions of the first to the fourth vibration transmission paths described with reference to FIG. 14 are designated as W1 to W4. A sum of these transfer functions is designated as W.

Control in this example is substantially similar to that of Example 1. However, there are differences in the following points. A transfer function G2 is a transfer function from the wheel housing 22 to the error signal detector 263 in the vehicle interior 70. $Y_k$ is transmitted control sound in the error signal detector 263. That is to say, G is a transfer function from the control signal generating unit 110 to the error signal detector 263.

Moreover, as mentioned above, vibration $x_k$ input to the wheel 10 is transmitted to the position of the error signal detector 263 through the respective transfer functions W1 to W4 of the first to the fourth vibration transmission paths. That is to say, the transfer function from the wheel 10 to the error signal detector 263 can be grasped as a sum W of W1 to W4. Accordingly, road noise (transmitted noise) transmitted through the transfer function sum W is $d_k$.

As having been described above, road noise in the vehicle interior 70 can be reduced by vibrating the member located in the vibration transmission paths by the vibration generator 61 even in the presence of the plurality of vibration transmission paths. Since road noise is not reduced by a speaker as mentioned above, the active noise cancellation apparatus of this example is free from problems of a conventional case in which road noise is reduced by generating control sound (secondary noise) by a speaker.

That is to say, since noise is not reduced by control sound (secondary control), problems such as dependence on location of the speaker do not occur. The vibration generator 61 is mounted on the wheel housing 22 in this example, but instead of this, the vibration generator 61 can be mounted on another member which constitutes the vehicle body. For example, the vibration generator 61 can be mounted on the suspension member 48. Even if the vibration generator 61 is thus placed at a position other than on the wheel housing 22, road noise in the vehicle interior 70 can be similarly reduced.

Moreover, since vibration is generated by the vibration generator 61, the range of control frequency of the vibration generator 61 is very smaller than that of the control frequency of a speaker. Therefore, arithmetic processing speed of the control circuit of the controller 200 can be decreased and accordingly costs can be low. Moreover, since the vibration generator 61 is mounted on a vehicle component part such as the wheel housing 22 in the vibration transmission paths, the degree of freedom in location is high when compared to the degree of freedom in location in the vehicle interior 70.

Furthermore, although the vibration generator 61 is mounted on only one portion of the wheel housing 22 in this example in spite of the presence of the plurality of vibration transmission paths W1 to W4, road noise can be reduced. That is to say, there is no need to install vibration generators 61 on a number of portions of the floor panel 21 and a number of portions of the plate-like interior member 23, which are sources of road noise. This is because noise detected by the error signal detector 263 placed in the vehicle interior 70 is used as the error signal $e_k$ and the vibration generator 62 generates vibration force so as to reduce this error signal $e_k$.

That is to say, vibration $x_k$ input from road surfaces is transmitted to the floor panel 21 and the plate-like interior member 23 via the plurality of vibration transmission paths W1 to W4, and the floor panel 21 and the plate-like interior member 23 are vibrated by vibration of the wheel housing 22 caused by the vibration generator 61. Thus the plurality of kinds of vibration transmitted from road surfaces and the vibration by the vibration generator 61 are combined at the floor panel 21 and the plate-like interior member 23. Then, the controller 200 controls the vibration generator 61 so as to reduce the error signal $e_k$, which is sound in the vehicle interior 70. That is to say, the controller 200 controls the vibration generator 61 so as to reduce the combined vibration of the floor panel 21 and the plate-like interior member 23.

That is to say, the vibration generator 61 vibrates the wheel housing 22 so as not to reduce vibration of the wheel housing 22 itself on which the vibration generator 61 is mounted but to reduce road noise in the vehicle interior 70. The vibration generator 61 does not always reduce the vibration of the wheel housing 22 itself on which the vibration generator 61, and in some cases increases vibration of the wheel housing 22 itself. Therefore, even in the presence of the plurality of vibration transmission paths W1 to W4, road noise in the vehicle interior 70 can be reliably reduced in this example.

Moreover, the reference signal detector 62 is mounted on the knuckle 41, which is a common component part in the plurality of vibration transmission paths W1 to W4. This enables reliable detection of the reference signal $r_k$, which affects the plurality of vibration transmission paths W1 to W4. Therefore, a component of the error signal $e_k$ attributable to the reference signal $r_k$ can be reliably reduced.

It should be noted that the vibration generator 61 is mounted on only one portion in this example but can be mounted on each of a plurality of portions. However, when a plurality of vibration generators 61 are placed, the respective vibration generators 61 need to be controlled in consideration of effects of the respective vibration generators 61.

REFERENCE SIGNS LIST

10: Wheel, 21: Floor panel (plate-like member), 22: Wheel housing, 23: Plate-like interior member, 41: Knuckle, 44: Lower arm (suspension arm), 45: Upper arm (suspension arm), 48: Suspension member, 49: Member mount, 51: Shock absorber, 52: Upper support, 61, 161: Vibration generator, 62: Reference signal detector, 63, 163, 263: Error signal detector, 70: Vehicle interior, 80: Suspension system, 100, 200: Controller

What is claimed is:
1. An active noise cancellation apparatus for actively reducing noise in an interior of a vehicle, the vehicle generating road noise in the interior of the vehicle by causing a plate-like member of vehicle component parts to vibrate, the plate-like member vibrating by vibration input from road surfaces to a wheel being transmitted to the plate-like member, wherein the active noise cancellation apparatus comprises:
a reference signal detector mounted on a knuckle for supporting the wheel in at least one vibration transmission path from the wheel to the plate-like member and detecting vibration of the knuckle as a reference signal;
a vibration generator mounted on a wheel housing or on a suspension member in the vibration transmission path, the wheel housing connected to the plate-like member and supporting a suspension system, the suspension member connected to the plate-like member and constituting the suspension system, and the vibration generator applying vibration force to the wheel housing or the suspension member;
an error signal detector for detecting vibration of the wheel housing or vibration of the suspension member as an error signal or detecting sound in the interior of the vehicle as an error signal; and
a controller for controlling the vibration generator based on the reference signal and the error signal so as to reduce the error signal.

2. The active noise cancellation apparatus according to claim 1, wherein
the vehicle includes:
the knuckle for rotatably supporting the wheel;
a suspension arm connected to the knuckle;
a shock absorber connected to the suspension arm;
an upper support attached to the shock absorber; and
the wheel housing attached to the upper support and connected to the plate-like member,
the reference signal detector is mounted on the knuckle, and
the vibration generator and the error signal detector are mounted on the wheel housing.

3. The active noise cancellation apparatus according to claim 2, wherein the vibration generator and the error signal detector are placed at positions which are closer to the upper support than to the plate-like member on the wheel housing.

4. The active noise cancellation apparatus according to claim 1, wherein
the vehicle includes:
the knuckle for rotatably supporting the wheel;
a suspension arm connected to the knuckle; and
the suspension member connected to the suspension arm and connected to a floor panel as the plate-like member by way of a member mount,
the reference signal detector is mounted on the knuckle, and
the vibration generator and the error signal detector are mounted on the suspension member.

5. The active noise cancellation apparatus according to claim 1, wherein:
the vibration transmission path from the wheel to the plate-like member is a plurality of vibration transmission paths;
the vibration generator is placed in at least one of the plurality of vibration transmission paths; and
the error signal detector is a microphone for detecting sound in the interior of the vehicle as the error signal.

6. The active noise cancellation apparatus according to claim 5, wherein:
the plurality of vibration transmission paths include at least a path from the wheel to the wheel housing and a path from the wheel to the suspension member, and
the vibration generator is mounted on the wheel housing constituting one of the vibration transmission paths, or on the suspension member constituting another of the vibration transmission paths.

7. The active noise cancellation apparatus according to claim 6, wherein the reference signal detector is mounted on a common component part in the plurality of the vibration transmission paths.

* * * * *